United States Patent
Clark et al.

(10) Patent No.: US 6,579,100 B1
(45) Date of Patent: Jun. 17, 2003

(54) INTERACTIVE LEARNING SYSTEM METHOD FOR INFANTS, TODDLERS AND YOUNG CHILDREN

(75) Inventors: William E. Clark, Littleton, CO (US); Julie Clark, Littleton, CO (US)

(73) Assignee: The Baby Einstein Company, Littleton, CO (US)

( * ) Notice: Subject to any disclaimer, the term of this patent is extended or adjusted under 35 U.S.C. 154(b) by 0 days.

(21) Appl. No.: 09/696,171

(22) Filed: Oct. 25, 2000

Related U.S. Application Data

(60) Provisional application No. 60/161,342, filed on Oct. 25, 1999.

(51) Int. Cl.[7] .............................................. G09B 17/00
(52) U.S. Cl. ....................... 434/172; 434/169; 434/185; 434/307 R
(58) Field of Search .......................... 434/118, 156–159, 434/167–169, 172, 178, 182, 188, 307 R, 308, 322, 323, 362, 365; 345/211, 473, 581, 739; 273/292, 299, 304

(56) References Cited

U.S. PATENT DOCUMENTS

| | | | | |
|---|---|---|---|---|
| 5,120,230 A | * | 6/1992 | Clark et al. | 434/307 R |
| 5,145,375 A | * | 9/1992 | Rubio | 434/157 |
| 5,147,205 A | * | 9/1992 | Gross et al. | 434/169 |
| 5,556,283 A | * | 9/1996 | Stendardo et al. | 434/188 |
| 5,568,924 A | * | 10/1996 | Katsuren | 273/292 |
| 5,575,659 A | * | 11/1996 | King et al. | 434/167 |
| 5,697,789 A | * | 12/1997 | Sameth et al. | 434/157 |
| 5,741,136 A | * | 4/1998 | Kirksey et al. | 434/169 |
| 5,788,502 A | * | 8/1998 | Shea | 434/157 |
| 5,788,503 A | * | 8/1998 | Shapiro et al. | 434/172 |
| 5,827,071 A | * | 10/1998 | Sorensen et al. | 434/323 |
| 6,077,080 A | * | 6/2000 | Rai | 434/170 |

\* cited by examiner

*Primary Examiner*—Joe H. Cheng
(74) *Attorney, Agent, or Firm*—Charles Berman; Margo Maddux; Greenberg Traurig, LLP

(57) ABSTRACT

A learning system method for infants, toddlers and young children which uses selected visuals stored on an audiovisual storage and playback device in conjunction with unique flash cards to provide an enhanced learning experience.

5 Claims, 7 Drawing Sheets

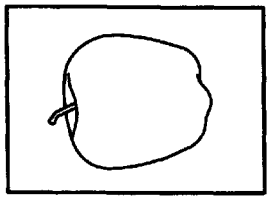
FIG. 1B
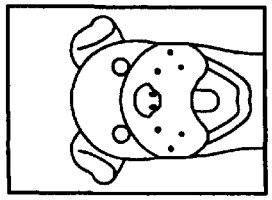
FIG. 2B
FIG. 3B

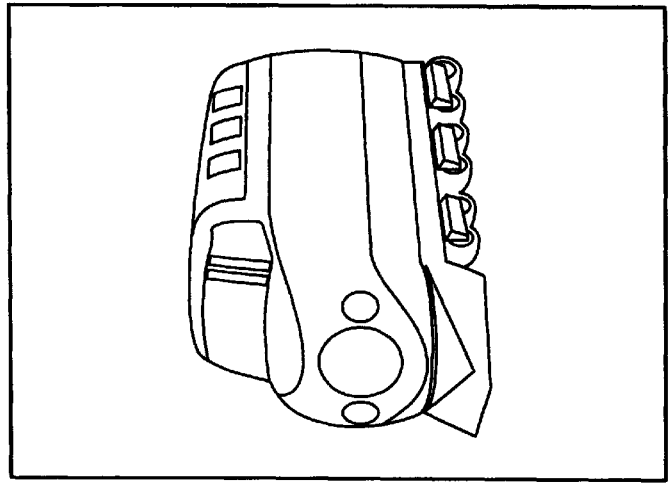

FIG. 10 train

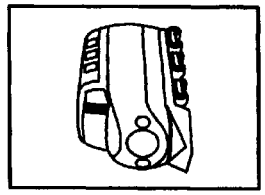

train is seen on the
the Baby Einstein video

Teaching Tips

1. Look at the red train!
   What do you see?
2. A train says "choo choo!"
   What sound does a train make?
3. Would you like to ride on a train?

Language lesson

| English  | train    | TRAYN       |
| Spanish  | el tren  | el TRAIN    |
| French   | le train | luh TRENG   |
| German   | der Zug  | dare TSOOK  |
| Hebrew   | rakevet  | rah-KEH-vet |
| Japanese | kisha    | kee-shah    |
| Russian  | poezd    | POH-yizd    | visit www.babyeinstein.com to hear pronunciations.

FIG. 7

- USE THE CARDS AFTER WATCHING THE VIDEO WITH YOUR BABY AS A REVIEW OR REINFORCEMENT ACTIVITY. THE TEACHING TIPS PROVIDE IDEAS FOR EXPANDING DEVELOPMENT OF WORDS AND CONCEPTS.

- LET YOUR BABY PLAY WITH THE CARDS. YOU'LL PROBABLY FIND HE OR SHE ENJOYS HOLDING THEM. ENCOURAGE YOUR BABY TO PICK CARDS AND IDENTIFY THE IMAGE BY ASKING, "WHAT DO YOU SEE?" OR "CAN YOU FIND THE BANANA?". OLDER BABIES CAN GROUP THE CARDS INTO STACKS OF TOYS, ANIMALS AND FOODS.

REMEMBER TO ENCOURAGE YOUR BABY'S NATURAL CURIOSITY RATHER THAN FORCING A PARTICULAR DEVELOPMENT RATE. THE BEST STRATEGY ALWAYS IS LOVE, PLAY AND TEACH.

FLASH CARD DESIGN

EXAMINE ONE OF THE CARDS. ON THE PICTURE SIDE THE WORD APPEARS IN SIMPLE, BOLD TEXT. FROM A VERY YOUNG AGE, CHILDREN BEGIN TO UNDERSTAND THAT PARTICULAR COMBINATIONS OF LETTERS MAKE UP PARTICULAR WORDS, AND THAT THOSE WORDS HAVE MEANING. THIS IS THE FIRST STEP TOWARD SIGHT RECOGNITION OF PRINTED WORDS.

ON THE BACK SIDE, WE OFFER TEACHING TIPS. THESE ARE EXAMPLES OF THINGS YOU CAN SAY, ASK OR DO AS YOU USE THE FLASH CARDS. DEPENDING ON YOUR BABY'S AGE AND LEVEL OF DEVELOPMENT, YOU CAN CHOSE TO USE ALL OF THE TIPS OR ONLY A FEW. AND BY ALL MEANS, INVENT YOUR OWN. WHENEVER YOU HAVE THE OPPORTUNITY, MAKE THE OBJECTS ON THE CARDS A PART OF YOUR BABY'S LIFE EXPERIENCES. POINT OUT STARS IN THE NIGHT SKY AND RELATE THEM BACK TO THE STAR CARD OR SMELL A FLOWER WITH YOUR BABY AS YOU HOLD THE FLOWER CARD IN YOUR HAND. IN THIS WAY THE FLASH CARDS NOT ONLY REINFORCE VOCABULARY, BUT CAN BE USED TO TEACH COLORS, PARTS, CONCEPTS, SOUNDS AND RELATIONSHIPS IN NATURE.

WE'VE ALSO INCLUDED THE WORD TRANSLATED INTO SIX FOREIGN LANGUAGES HEARD ON THE BABY EINSTEIN VIDEO THE TRANSLATIONS AND TRANSLITERATIONS WERE PROVIDED BY BERLITZ. TO HEAR PRONUNCIATIONS, VISIT OUR WEB SITE AT: WWW.BABYEINSTEIN.COM

FIG. 8

PARENT'S GUIDE
JULIE AIGNER-CLARK

baby Webster

I WILL NEVER FORGET THE FIRST TIME MY DAUGHTER, ASPEN SPOKE A WORD OTHER THAN "MAMA" OR "DADA." HER FIRST WORD WAS "OATMEAL" -PRONOUNCED "EE-MO" -BUT I KNEW WHAT SHE MEANT. TWO YEARS LATER IT WAS SIERRA'S TURN, AND HER FIRST WORD WAS "NOO NOO," WHICH MEANT "NOODLE." AS A FORMER ENGLISH TEACHER, NOTHING COULD BE SWEETER THAN TO HEAR MY LITTLE GIRLS BEGIN TO SPEAK.

AT THE BABY EINSTEIN COMPANY, WE BELIEVE THERE IS NO COMBINATION MORE POWERFUL - OR MORE WONDERFUL - THAN A CURIOUS BABY, A LOVING PARENT AND AN ENGAGING TEACHING TOOL. WE WORK HARD TO PROVIDE IMPORTANT AND STIMULATING LEARNING EXPERIENCES FOR PARENTS AND CHILDREN TO SHARE.

THE BABY WEBSTER FLASH CARDS CAN BE USED ALONE OR IN CONCERT WITH OUR FIRST THREE VIDEOS - BABY EINSTEIN, BABY MOZART AND BABY BACH. SEVERAL CHARACTERISTICS MAKE THESE FLASH CARDS UNIQUE: THEY EMPLOY PHOTO-GRAPHIC IMAGES OF FAMILIAR, REAL-WORLD OBJECTS; THE IMAGES ARE REINFORCED IN VIDEO; AND EACH WORD IS TRANSLATED INTO THE SEVEN LANGUAGES FEATURED ON THE BABY EINSTEIN VIDEO. THE CARDS ALSO INCLUDE TEACHING TIPS THAT ENCOURAGE INTER ACTIVITY BETWEEN YOU AND YOUR BABY. AND THEY'RE LARGER AND MORE DURABLE THAN TRADITIONAL FLASH CARDS, MAKING THEM PERFECT FOR CURIOUS LITTLE HANDS.

USING BABY WEBSTER WITH YOUR BABY

GREAT TEACHERS CREATE ENGAGING AND VARIED LEARNING ENVIRONMENTS IN WHICH CHILDREN BOTH ACQUIRE AND APPLY KNOWLEDGE. IN BABY WEBSTER, WE'VE DESIGNED A MULTI-FACETED RESOURCE THAT SUPPORTS SEVERAL TEACHING STRATEGIES

- USE THE CARDS BEFORE WATCHING THE VIDEO WITH YOUR BABY. WHEN THE SAME OR SIMILAR IMAGES APPEAR IN THE VIDEO, POINT AND NAME THE OBJECTS. THIS APPROACH CREATES PRIOR KNOWLEDGE THAT IS REINFORCED AND EXTENDED WHEN THE OBJECT APPEARS IN THE VIDEO.

FIG. 9

INTERACTIVE LEARNING SYSTEM METHOD FOR INFANTS, TODDLERS AND YOUNG CHILDREN

RELATED APPLICATIONS

This application is based on provisional application Serial No. 60/161,342, filed Oct. 25, 1999. This application is incorporated by reference.

FIELD OF THE INVENTION

This invention relates to an interactive teaching method and, more particularly, to an interactive teaching method which makes use of an electronic medium combined with unique flash cards to provide important and stimulating learning experiences for parents, infants and toddlers in the home and preschool environment.

BACKGROUND OF THE INVENTION

It is well known that the educational experience is the key to an individual's success, and indeed, in many cases, to the prosperity and success of nations. It is also known that proper educational stimulation at a very early age, i.e., at the infant and toddler stage, will very often lead to enhanced learning ability as the child progresses through the educational system. Interactive educational methods, utilizing a combination of video material and printed material, is also known to be highly effective in conveying information to eager young minds.

One such interactive teaching method is described in U.S. Pat. No. 5,120,230, granted to William E. Clark, et al, on Jun. 9, 1992 ("Clark Patent").

The Clark Patent describes an interactive method of effectively and efficiently conveying information which makes use of video disc technology, along with associated printed material. A video disc is provided, on which is stored a video lesson which contains pictures, diagrams, movie clips, etc., to make the topic being taught come to life with the presentation of the visual images. Printed lesson materials are also provided for in the Clark Patent, which printed materials, when used in combination with the video production, allow a teacher to customize lesson plans and have access to narratives and reference material related to the video presentation.

Although the Clark Patent was an acknowledged advance in the area of interactive teaching methods, it was primarily directed to a classroom environment and to children beyond the infant and toddler stage.

It is an object of the present invention to provide an interactive teaching method that is particularly useful in the home and preschool environment.

It is a further object of the present invention to provide an interactive teaching method that is directed to infants and toddlers.

It is a still further object of the instant invention to provide an interactive teaching method that uses video information in combination with unique flash cards.

SUMMARY OF THE INVENTION

The present invention is directed to a learning system method for infants, toddlers and young children, utilizing an audiovisual storage and playback device in conjunction with printed material, such as flash cards.

It is a feature of the invention that one side of a flash card has a picture associated with a selected visual stored on the audiovisual storage and playback device, along with a word in bold type.

It is another feature of the invention that a second side of the flash card includes questions which can be used by a caregiver to stimulate the infant or toddler as the selected visual is being shown.

It is a still further feature of the invention that the flash card may also include foreign language cards and phrases for use by the caregiver in simulating the infant or toddler.

It is a general feature of the invention that the use of selected visuals, in conjunction with the unique flash cards, greatly enhances the interest of an infant or toddler when exposed to the educational material being presented.

The foregoing and other objects and features of the present invention will be more fully understood from the following description of an illustrative embodiment thereof, in conjunction with the accompanying drawings.

BRIEF DESCRIPTION OF THE DRAWINGS

FIGS. 1B, 2B and 3B illustrate the reverse side of the flash cards used with the present inventions.

FIG. 7 is a depiction of one embodiment of the present invention showing one face of the flashcard;

FIG. 8 is an exemplary depiction of an instruction sheet accompanying the flashcards according to one embodiment of the present invention;

FIG. 9 is an exemplary depiction of an instruction sheet accompanying the flashcards according to one embodiment of the present invention; and FIG. 10 is a depiction of a train on one face of the flashcard for stimulating a child.

DETAILED DESCRIPTION

The present invention is directed to a learning system method for infants, toddlers and young children, with the intent to teach vocabulary, pronunciation, and basic concepts.

The method utilizes selected visuals stored on an audiovisual storage and playback device in conjunction with flash cards or a book. The audiovisual storage and playback device can consist of videotape, CD technology, DVD technology, online, i.e., Internet access, as well as future presentation technologies.

In one exemplary embodiment, a visual image from the audiovisual storage and playback device, such as a picture of a dog, is presented to an infant. Simultaneously, or at a later time, a flash card bearing the same image is also presented to the infant. The child's caregiver then stimulates the child by posing imaginative questions to the child based on the flash cards. Use of the flash cards, in conjunction with the video image, stimulates the child and reinforces the learning experience.

Figure 3A:
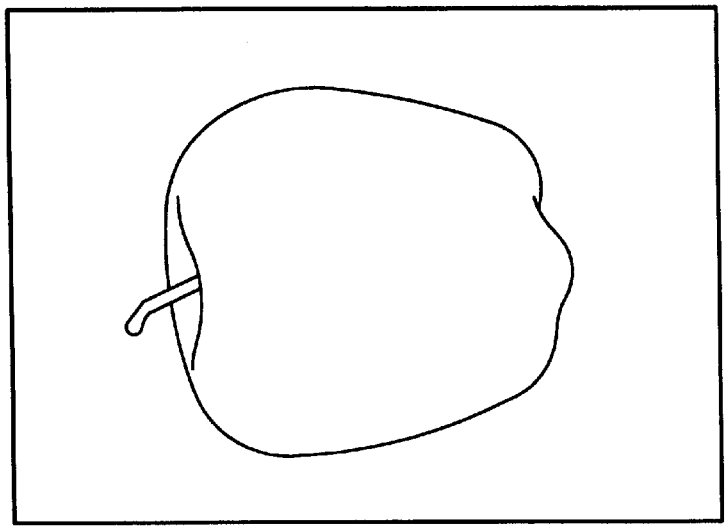
FIGS. 1A, 2A and 3A illustrate one side of the flash cards used with the present invention.
Figure 2A:
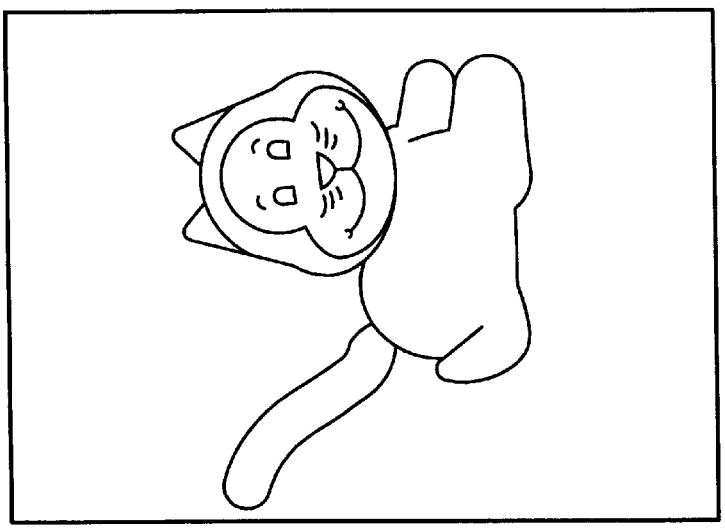
Figure 1A:
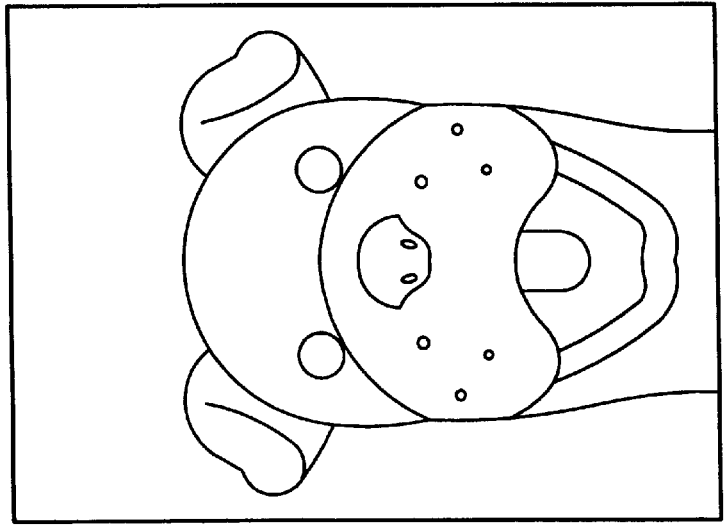
Figure 4:
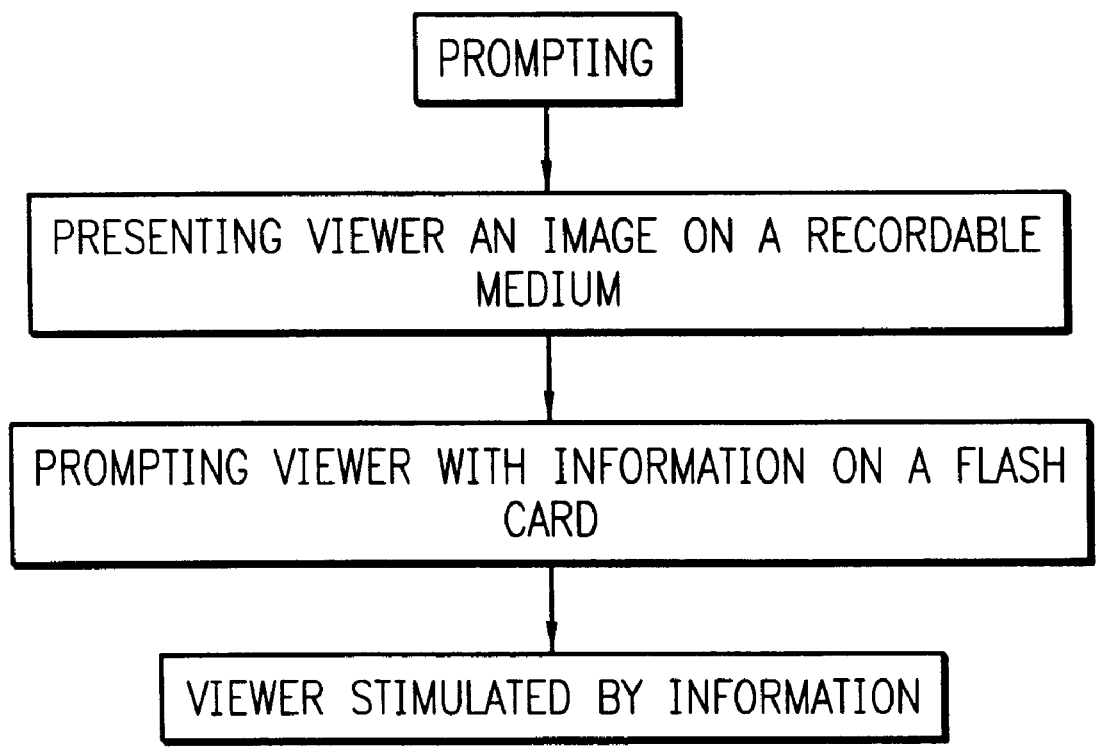
FIG. 4 is a flow chart of the method according to the claimed invention.

The flash cards utilized with the inventive method are advantageously designed to encourage the child to learn and to assist the caregiver. For example, referring to FIGS. 1A, 2A and 3A, there is shown a picture, along with a word in bold text. In this example, there is shown a dog, a cat and an apple, along with the accompanying word. It is known that from a very young age, children begin to understand that particular combinations of letters make up particular words, and that those words have meaning. On the back side of the flash card, as shown in FIGS. 1B, 2B and 3B, are teaching tips for the caregiver to use, such as the questions to ask the child and the word is also translated into a plurality of foreign languages.

In a second embodiment of the invention, the caregiver and the child are assisted in pronunciation by having the foreign language words stored on an audio storage and presentation device so that the word can be readily repeated. This embodiment can also include Internet access to a uniquely designed website to again assist the caregiver or child with pronunciations or the vocabulary words in the various languages.

Figure 5:
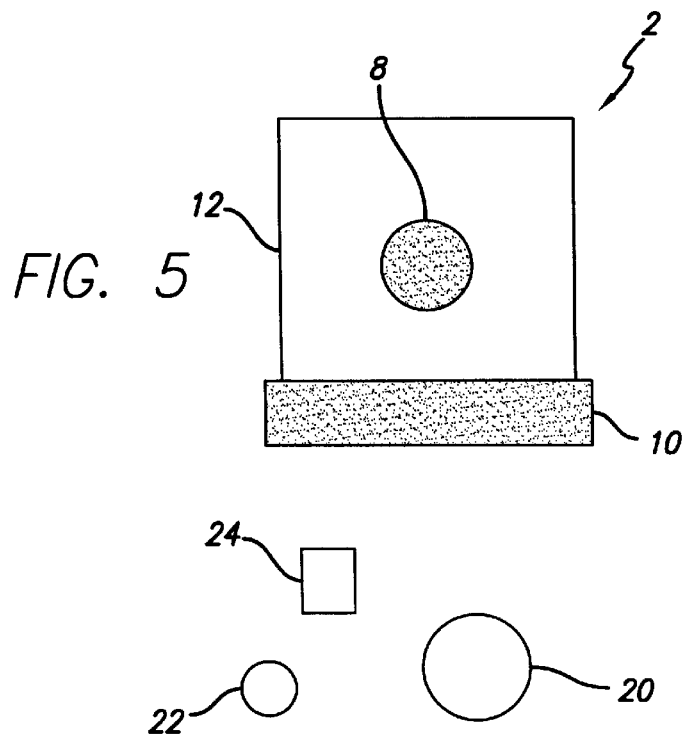
FIG. 5 depicts one aspect of the present invention comprising a recordable device, and a caregiver with at least one flashcard for stimulating an infant.

Further embodiments of the invention 2 (FIG. 5) include using a visual image 8 from the audiovisual playback device 12 and a recordable device 10, such as a picture of a train is presented to an infant. Simultaneously or at a later a later time flashcard 24 bearing the same image is also presented to the infant or child. The child's caregiver 20 then stimulates the child 22 by posing imaginative question to the child such as:

1. "Look at the train!, What do you see?"
2. A train says, "Choo-Choo!, What sound does a train make?"
3. Would you like to ride on a train?

Use of the flashcards 24 in conjunction with the video image 8 stimulates the child 22 and reinforces the learning experience.

Figure 6:
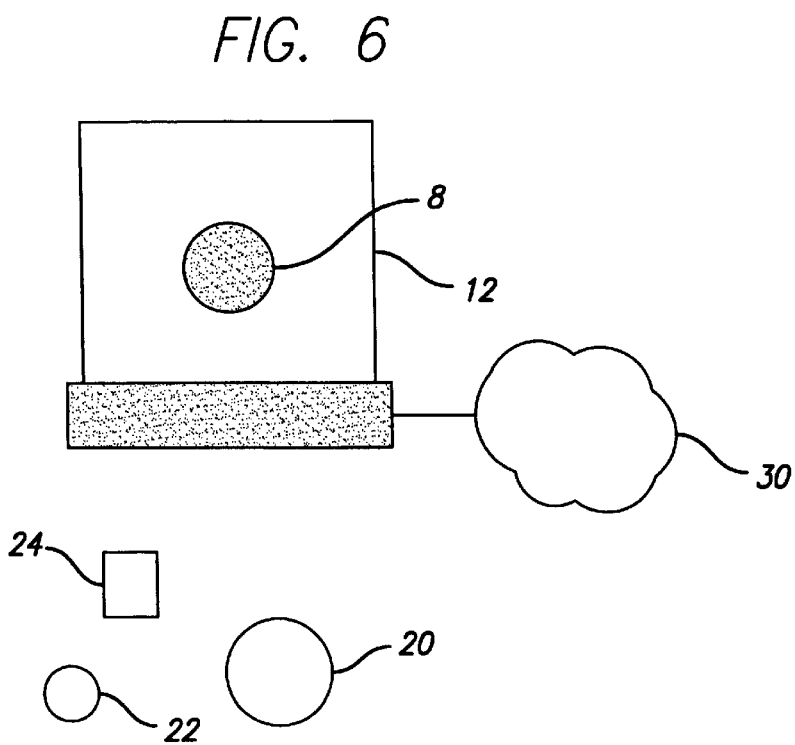
FIG. 6 depicts another aspect of the present invention comprising the utilization of flash cards in conjunction with the Internet.

In another embodiment of the present invention, the caregiver 20 and the child 22 are assisted in pronunciation by having the foreign language words stored on an audio storage/recordable device 10 and presentation device 12 so that the word can be readily repeated. This embodiment can also include Internet access 30 (FIG. 6) to a uniquely designed website to again assist the caregiver 20 or child 22 with pronunciations of the vocabulary words in the various languages.

In yet another embodiment of the present invention, the cards 24 can be used by the caregiver 20 before watching the video with the baby 22. When the same, or similar, images 8 appear in the video, the child could be asked to point and name the objects as displayed in the video. This approach creates prior knowledge that is reinforced and extended when the object appears in the video.

In yet another embodiment of the present invention, the caregiver 20 can encourage the baby 22 to play with the cards 24. For example, the baby 22 could be encouraged to pick up the cards 24 and identify the images on the cards 24 themselves or on the video by asking "What do you see?" or "Can you find the banana?". Furthermore the babies could also be encouraged to group the cards based on similarity into stacks toys, animals, and other objects.

Although specific embodiments of the invention have been shown and described, it will be understood that various modifications may be made without departing from the spirit of this invention.

We claim:

1. A learning system method directed to an infant comprising:

presenting to the infant a selected image stored on a recordable medium, said image corresponding to a object; and prompting the infant with information on at least one flash card in order to stimulate the infant;

wherein said information on the flashcard includes data relating to the object and pronunciations of the object in a plurality of languages.

2. A learning system method in accordance with claim 1, wherein a first side of the flash card contains a picture which matches the selected visual.

3. A learning system method in accordance with claim 2, wherein a second side of the flash card contains questions to be used by the caregiver.

4. A learning system method in accordance with claim 3, wherein the second side of the flash card contains foreign language words for use by the caregiver.

5. A learning system according to claim 1, wherein said recordable medium includes at least one of a videotape, CD, DVD, and an Internet web site.

\* \* \* \* \*

UNITED STATES PATENT AND TRADEMARK OFFICE
CERTIFICATE OF CORRECTION

PATENT NO.    : 6,579,100 B1
DATED         : June 17, 2003
INVENTOR(S)   : William E. Clark et al.

It is certified that error appears in the above-identified patent and that said Letters Patent is hereby corrected as shown below:

Column 3,
Line 21, please delete the repeated words "a later".
Line 22, please insert the word -- a -- after the word "time".
Line 24, please delete the word "question", and insert the word -- questions --.

Column 4,
Line 13, please insert the word -- of -- after the word "stacks".
Line 13, please insert the word -- foods, -- after the word "animals.".
Line 14, please insert the following as a separate paragraph:
       -- On the back side of the flash card 24 are teaching tips which provide examples of things a caregiver can say, ask, or do as he or she uses the flash cards 24. Depending on the baby's age and level of development, the caregiver 20 can choose to use all of the tips or only a few. The instructions in the teaching tips could prompt the caregiver 20 to point out stars to the infant 22 or toddler in the night sky and relate them back to the star flash card. Alternatively, the instructions in the teaching tips would prompt the caregiver 20 to allow the infant/toddler 22 to see and smell a flower and then let the infant point out the flower in the flash cards 24. In this way, the flash cards 24 not only reinforce vocabulary , but can be used as an effective teaching vehicle to teach colors, parts, concepts, sounds and relationships in nature to an infant/toddler 22. --
Line 22, please delete the words "corresponding to a", and replace with the words -- corresponding to an --.

Signed and Sealed this

Sixth Day of April, 2004

JON W. DUDAS
*Acting Director of the United States Patent and Trademark Office*